United States Patent
George

[15] 3,652,146
[45] Mar. 28, 1972

[54] PRECISION MICROSCOPE STAGE

[72] Inventor: David Sydney George, Cambridge, England

[73] Assignee: Image Analysing Computers Limited, Melbourn, Royston, England

[22] Filed: Oct. 27, 1970

[21] Appl. No.: 84,366

[30] Foreign Application Priority Data

Oct. 31, 1969 Great Britain.....................53,406/69

[52] U.S. Cl..................................350/86, 74/27, 269/59, 350/90
[51] Int. Cl. .....................................................G02b 21/26
[58] Field of Search ...............350/81, 84, 86, 90; 248/157, 248/419, 421, 422; 108/137, 147; 269/51, 59, 60; 74/89.15, 27

[56] References Cited

UNITED STATES PATENTS

| 2,365,594 | 12/1944 | Roeder | 350/84 |
| 2,669,158 | 2/1954 | Frischmann | 350/86 |
| 2,677,987 | 5/1954 | Gallasch | 350/86 |

FOREIGN PATENTS OR APPLICATIONS

| 665,837 | 7/1964 | Italy | 350/84 |

Primary Examiner—David Schonberg
Assistant Examiner—Ronald J. Stern
Attorney—Beveridge & De Grandi

[57] ABSTRACT

The present invention provides a precision stage assembly for an optical microscope which comprises an outer frame adapted to be rigidly mounted on the main structure of an optical microscope, an inner frame for carrying an X and Y traverse device on which a specimen may be carried, an intermediate frame between the inner and outer frames adjustable relative to the outer frame by a coarse focus drive, and releasable clamping means for rigidly clamping together the intermediate and outer frames, said inner frame being adjustable relative to the intermediate frame by a fine focus control mechanism and the inner frame being located with reference to the intermediate frame such that significant relative movement therebetween is restricted to movement in a vertical direction.

10 Claims, 4 Drawing Figures

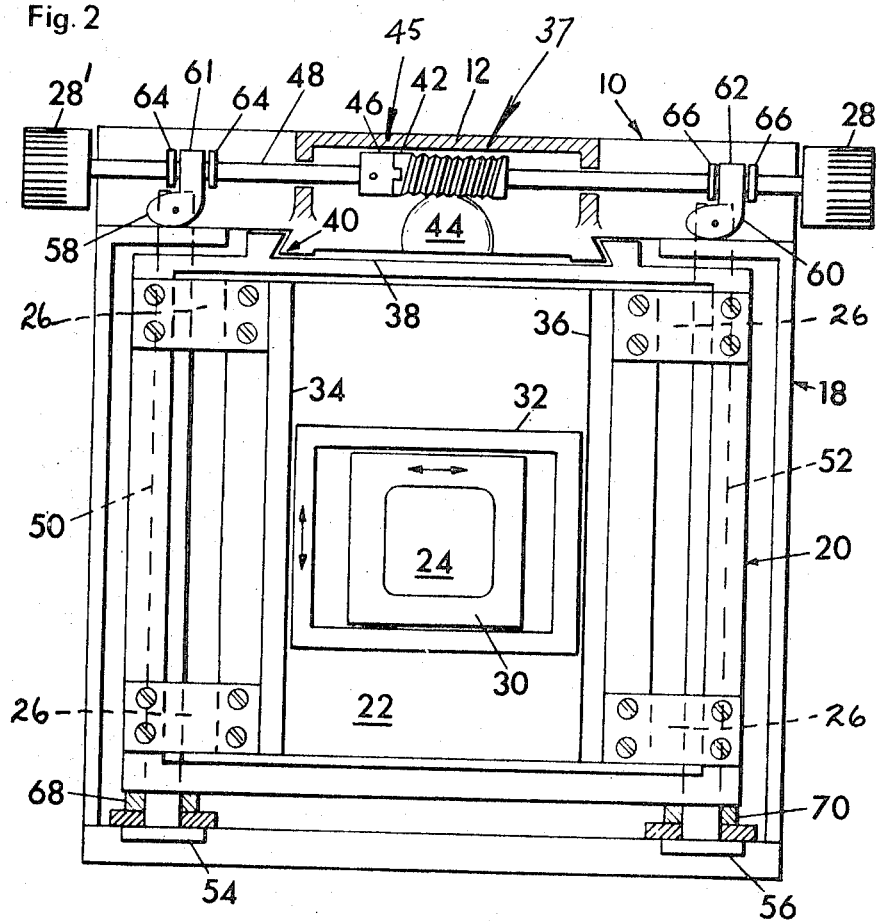
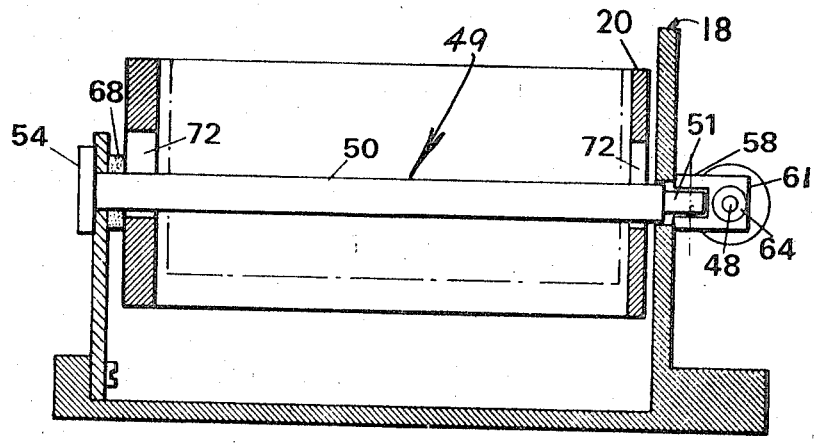

PRECISION MICROSCOPE STAGE

This invention relates to image analysis and in particular to a precision stage for an optical microscope when employed in image analysis.

Due to the restricted field of view of a microscope, only a small fraction of the total area of a specimen can be seen at any one time when viewed through a microscope. In image analysis it is usually necessary to consider all or at least a large portion of the total area of a specimen under analysis and it is thus necessary to move the specimen relative to the optical axis of the microscope so that different regions of the surface of the specimen can be viewed.

A microscope for use in automated image analysis must therefore include provision for motorized control of specimen traverse. This traverse may be incremental along X and Y axes or may be random.

It will be appreciated that it is essential for the specimen to remain in focus during the entire analysis which, when an entire specimen is to be traversed incrementally along X and Y axes, may take some considerable time. Reaction from traverse drive systems and environmental disturbances such as operator movement etc., have been found to affect the focus setting and it is an object of the present invention to provide an image stage for an optical microscope which allows traverse of a specimen with a significant improvement in resistance to vibration over any previously known microscope stage.

It is a further object of the present invention to allow for coarse and fine adjustment of the focus of a specimen on such a stage.

According to the present invention a precision stage assembly for an optical microscope comprises an outer frame adapted to be rigidly mounted on the main structure of an optical microscope, an inner frame for carrying an X and Y traverse device on which a specimen may be carried, an intermediate frame between the inner and outer frames adjustable relative to the outer frame by a coarse focus drive, and releasable clamping means for rigidly clamping together the intermediate and outer frames, said inner frame being adjustable relative to the intermediate frame by a fine focus control mechanism and the inner frame being located with reference to the intermediate frame such that significant relative movement therebetween is restricted to movement in a vertical direction.

Preferably the inner frame is located with reference to the intermediate frame by means of a semi-kinematic double plane system of strip hinges.

Since the movement of the inner frame is restricted to vertical movement relative to the microscope body, it is therefore also restricted to movement in line with the optical axis of the microscope. The design reduces all unwanted movement such as tilt and lateral shift, to a minimum.

Preferably fine focus adjustment is provided by a low-friction lever system capable of either manual or motorized actuation. The inner frame is at all times restrained between the fine focus lever mechanism and the intermediate frame.

Conveniently, coarse focus motion is produced by a conventional worm and worm-wheel drive, acting on the intermediate frame to move the latter with respect to the outer frame and therefore the microscope body. Preferably the coarse focus drive is normally disengaged and is only engaged when coarse focusing is required.

According to a particularly preferred feature of the present invention an interlock is provided between the means for engaging and disengaging the coarse focus drive, which automatically actuates the clamping means when the coarse focus drive is disengaged. Conveniently the clamping is effected through two clamping rods, one running along each side of the combined structure and acting on opposite end walls of the outer frame.

The invention will now be described by way of example with reference to the accompanying drawings, in which:

FIG. 1 is a perspective view of an optical microscope incorporating a precision stage constructed as one embodiment of the present invention, FIG. 2 is a plan view of the stage with parts of the support and outer intermediate frames removed so as to reveal the coarse focus drive and releasable clamping means, FIG. 3 is a section III—III of FIG. 1 through the stage viewed from the front and illustrates the fine focus drive, and FIG. 4 is a further section IV—IV of FIG. 1 through the stage as viewed from the side and shows another view of the releasable clamping means.

FIG. 1 illustrates an optical microscope having a base 10, vertical support 12 and eyepiece assembly 14. A conventional turret objective 16 is also carried by the eyepiece assembly 14.

The microscope stage comprises a three part structure and in accordance with the invention consists of an outer frame 18, an intermediate frame 20 slidable vertically relative to the outer frame 18 and an inner frame 22 carrying an X and Y traverse device (not shown) for supporting a specimen 24. The inner frame 22 is supported within the intermediate frame 20 by means of strip hinges 26 which are shown in greater detail in FIGS. 2 and 3. A control 28 (which is duplicated on the other side of the assembly) is provided to effect movement of a coarse focus drive (indicated generally by the reference numeral 37 in FIG. 2) and also serves to effect clamping of a releasable clamping mechanism (indicated generally by the reference numeral 49 in FIG. 4).

Referring to FIG. 2, the specimen 24 is here shown mounted in a carriage 30 which is itself slidable in a carriage mount 32 located between parallel rails 34, 36 on the inner frame 22. The carriage mount 32 is thus capable of sliding movement in one direction only and the carriage 30 is capable of sliding movement in a direction perpendicular to the direction of movement of the carriage mount 32. Appropriate relative movement of the carriage 30 and carriage mount 32 thus provides for the X and Y traverse required for automated image analysis.

The intermediate frame 20, is slidably mounted relative to the main microscope body and to the outer frame 18 by means of a vertical dovetailed joint of which the recess 38 is carried by the rear wall of the intermediate frame 20 and the dovetailed spigot 40 which normally fits in the dovetailed recess 38 is carried by the vertical rear wall of the outer frame 18.

The intermediate frame is moved vertically relative to the outer frame by means of the coarse focusing drive 37. This comprises a worm 42 driving a worm-wheel 44 which acts on a vertical screw (not shown) carried by the intermediate frame. Thus rotation of the worm 42 and therefore the worm-wheel 44 produces vertical displacement of the screw (not shown) and consequent vertical displacement of the intermediate frame 20 relative to the stationary outer frame 18. The worm is driven through a dog clutch 45 half of which is formed in the end of the worm and the other half of which comprises the chuck 46. This is keyed to a shaft 48 on which the worm 42 is freely rotatable. A controller 28, 28' is provided at opposite ends of the shaft 48 by which the latter can be rotated to effect vertical displacement of the intermediate frame.

The intermediate frame can be clamped rigidly relative to the outer frame by means of the releasable clamping mechanism 49 which is made up from two shafts 50, 52 which extend from front to back of the outer frame assembly. At the front end, each shaft 50 is formed with an enlarged head (54, 56 respectively) which engages the front wall of the outer frame members. At its other end, each shaft is pivotally joined to a cam (58, 60 respectively), each said cam including an integral lever portion (61, 62 respectively) engaged by lugs (64 or 66, respectively) mounted rigidly on the shaft 48. The engagement between the lugs and lever arms of the cams 58, 60 is such as to allow rotation of the shaft 48 but axial movement of the shaft 48 results in a pivoting of the lever-cam about the pivotal joint between the cam and the respective end of its shaft 50 or 52. It will be seen that the profile of the cam 58 or 60 is such that pivoting in either direction will result in a rising cam surface being presented to the rear wall of the outer frame 18 so that continued pivoting of either of the cams will result in its pivotal point moving away from the rear surface of the outer frame 18. This can only be achieved by a compressive action between the outer frame and the intermediate frame so that all abutting surfaces in alignment with each shaft 50 or 52 become tightly engaged thereby clamping the two frames together. The natural resilience of the material forming the outer frame allows for the necessary slight movement and the clamping is assisted by friction material washers 68, 70 on each of the two shafts 50 and 52 respectively and located between the front wall of the intermediate frame and the rear surface of the front wall of the outer frame.

The clamping mechanism is also shown in FIG. 4 of the drawings which illustrates in more detail the pivotal joint between the shaft 50 and its cam 58. It will be appreciated that a cross-sectional view showing the shaft 52 and cam 60 would be similar.

It will be seen from FIG. 4 that the cam is bifurcated so as to lie on opposite sides of a reduced section end portion 51 of the shaft 50 which is conveniently formed with parallel sides. A pin or similar joint is provided between the bifurcated ends of the cam 58 and the reduced section spigot 51. The lever portion of the cam 60 is formed with a through bore in which the shaft 48 is freely rotatable but which is of smaller diameter than the lugs 64 carried by the shaft 48.

The intermediate frame is partially cut away at 72 (see FIG. 4) to accommodate vertical displacement of the intermediate frame without interfering with the shaft 50 (and also shaft 52).

Lastly referring to FIG. 3, the inner frame 22 is adjustable in height relative to the intermediate frame by means of a fine focus drive 73 which is illustrated in some detail in FIG. 3. Operation of the drive is achieved by rotating a knob 74 which can also be seen in FIG. 1 on the far side of the perspective view contained therein. The knob 74 is carried by a shaft 76 having formed thereon two oppositely directed threads 78, 80. Two L-shaped levers 82, 84 are arranged beneath the inner frame 22 with the arm of lever 82 threadedly engaged on the threaded portion 78 and the upper arm of L-shaped lever 84 threadedly engaged on the oppositely handed thread 80. The horizontal limb of each lever 82, 84 is balanced on a knife edge (86, 88 respectively) and a floating thrust member (90 and 92 respectively) transmits thrust from the cantilevered end of the lower limb of the two L-shaped levers (82, 84 respectively). The opposite ends of the thrust members 90, 92 engage in appropriate recesses in the under side of the inner frame 22.

The knife edge supports 86, 88 are carried by internal abutments within the intermediate frame 20 and in view of this, rotation of the shaft 76 so as to produce movement of the two levers 82, 84 as shown by the arrow-heads (94, 96 respectively) will produce upward displacement of the inner frame 22 relative to the intermediate frame 20. This movement is accommodated by the resilience of the strip hinges 26 which it will be seen from FIG. 3, are arranged in two planes one above the other. The four strip hinges in the upper plane, can be seen in FIG. 1 but the four strip hinges in the lower plane are hidden from view in FIG. 1 and only two of these hinges can be seen in the sectional view of FIG. 3.

It will be seen that when the outer and intermediate frames are clamped there is little risk of relative movement between these two frames and all subsequent significant vertical stage movement is thus confined to that resulting from the controlled fine focus movement between the inner frame and the intermediate frame. By virtue of the design of the linkage between the inner frame and the intermediate frame, a semi-kinematic double plane support system is provided for the inner frame so that all significant movement of the inner frame is restricted to vertical movement between this frame and the intermediate frame and this is controlled accurately by the fine focus drive. Also, by virtue of the design of this drive, the lack of backlash results in the inner frame remaining fixed vertically at any given focus position.

It will be appreciated that a degree of articulation is required between each of the two arms 82, 84 and the thread engaging member (not shown) associated therewith, to allow the arms to become inclined relative to the axis of the shaft 76. Conveniently the upper end of each arm 82, 84 is cut away to form a channel through which the threaded shaft 76 is free to pass and an internally threaded sleeve (not shown) which engages on the threads 78 or 80, is secured to the upper end of each arm 82 and 84 by means of a resilient bridge (not shown). Alternatively the internally threaded sleeve (not shown) may be pivotally mounted within an oversize aperture in the upper end of each arm 82, 84 about an axis perpendicular to the shaft 76.

The amount of movement of the inner frame 22 relative to the intermediate frame 22 is governed by the length and the resilience of the material forming the strip hinges 26. The arrangement illustrated in the embodiment described with reference to FIGS. 1 to 4 of the accompanying drawings allows a limited degree of movement of the inner frame 22 sufficient for most purposes. However, where extra movement of the inner frame 22 in the vertical direction is required, each strip hinge 26 may be formed with a crease or more than one crease forming, for example, an S bend along its length, thereby increasing the effective length of each strip hinge 26.

I claim:

1. A precision stage assembly for use with an optical microscope comprising:
   an outer frame;
   an inner frame for carrying an X and Y traverse device on which a specimen is carried;
   an intermediate frame between the inner and outer frames;
   coarse focus control means enabling the intermediate frame to be adjusted relative to said outer frame;
   releasable clamping means enabling the intermediate and outer frames to be rigidly clamped together;
   fine focus control means enabling the inner frame to be adjusted relative to the intermediate frame; and
   means locating the inner frame with reference to the intermediate frame in such a manner that significant relative movement therebetween is restricted to movement in a vertical direction.

2. A precision stage assembly according to claim 1 in which said fine focus control means comprises a low friction lever system located between said intermediate and inner frames.

3. A precision stage assembly according to claim 2 in which said fine focus control means is actuable manually.

4. A precision stage assembly according to claim 2 in which a motor means is provided for actuating said fine focus control means.

5. A precision stage assembly according to claim 1 in which said coarse focus control means comprises a worm and worm-wheel drive means acting on said intermediate frame for moving the latter with respect to said outer frame.

6. A precision stage assembly according to claim 1 in which a clutch means is provided for selectably disengaging said coarse focus control means.

7. A precision stage assembly according to claim 6 further comprising an interlock means operably located between said clutch means and said releasable clamping means such that disengagement of said coarse focus control means results in said outer and intermediate frames becoming clamped together and vice versa.

8. A precision stage assembly according to claim 1 in which said releasable clamping means comprises two clamping rods which extend along two opposite sides of the combined structure formed by the outer and intermediate frames and project from opposite ends of said combined structure each rod including an enlarged head portion at one end and a pivoted cam and integral lever assembly at the other end arranged such that pivoting of said cam relative to its rod results in a reduction in the effective distance between said enlarged head end of the rod and said opposed cam surface which produces a compression on the outer and intermediate frame members situated between said enlarged head end of said rod and its opposed cam surface to thereby clamp together said outer and intermediate frames.

9. A precision stage assembly according to claim 1 in which said inner frame is located with reference to said intermediate frame by a semi-kinematic double plane system of strip hinges.

10. A precision stage assembly according to claim 1 when combined with an optical microscope having a supporting structure with said outer frame rigidly attached to said supporting structure.

* * * * *